United States Patent Office 3,103,729
Patented Sept. 17, 1963

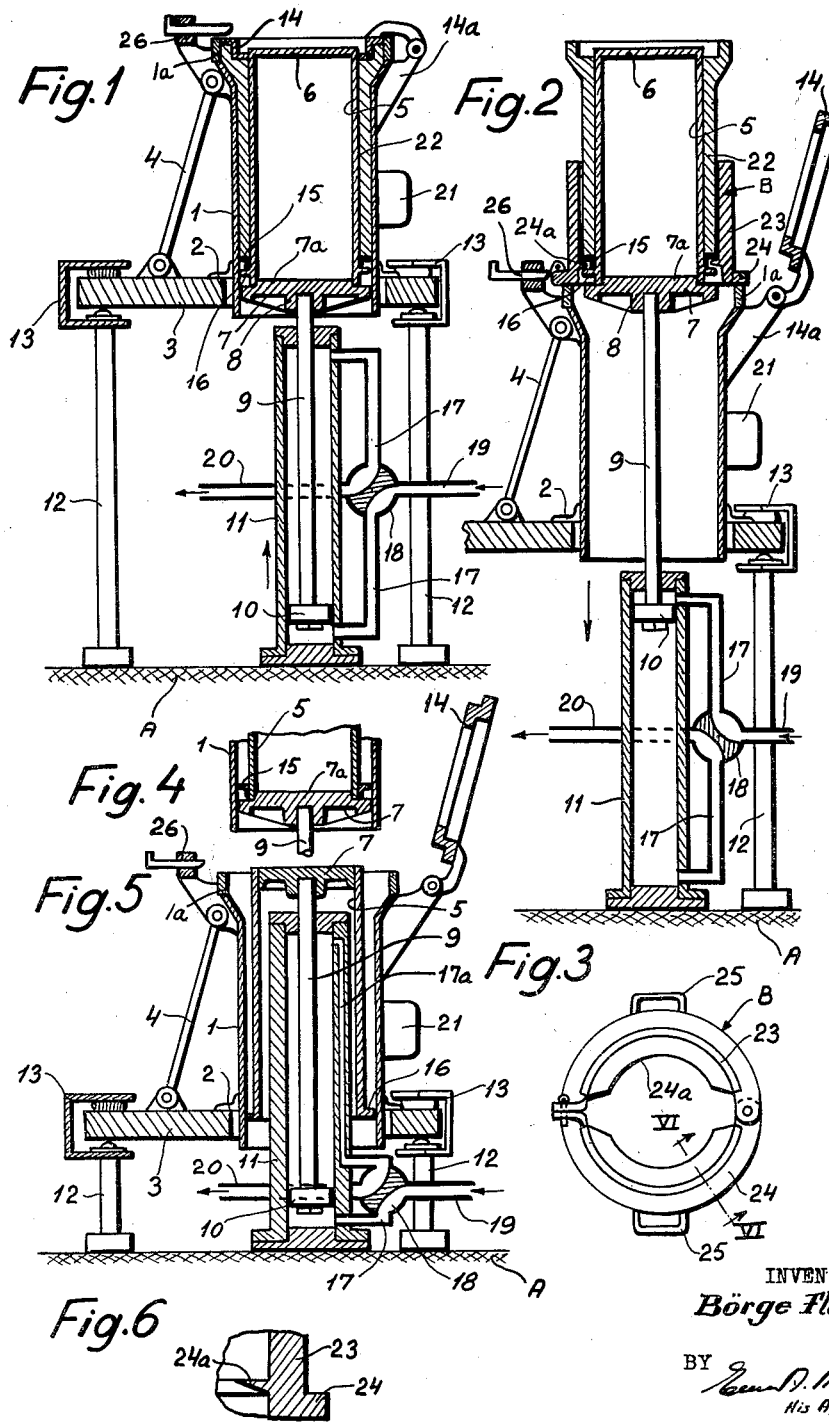

3,103,729
METHOD AND APPARATUS FOR MOLDING TUBULAR CONCRETE BODIES
Börge Flamand, 5 Naestvedvej, Ringsted, Denmark
Filed July 7, 1954, Ser. No. 441,745
Claims priority, application Denmark July 11, 1953
7 Claims. (Cl. 25—30)

This invention relates to the molding of tubular concrete bodies such as e.g. circular or polygonal concrete pipes. More particularly this invention relates to the molding of such tubular concrete bodies by application of a molding device comprising an outer mold and a core within this outer mold, which core may be reciprocated axially of said outer form and serves therewith to provide a tubular mold space serving as a receptacle for receiving a concrete mass adequate to form the said tubular body.

One object of the invention is to improve and simplify the existing methods for moulding tubular concrete bodies.

Another object of the invention is to provide an apparatus that will very rapidly and effectively perform the operations incident to the production of tubular concrete bodies.

A further object of the invention is to provide an apparatus for molding concrete bodies and comprising a stationary outer mold and a core within said outer mold reciprocative axially thereof and by which apparatus apart from possible compressing movements said core has to be displaced only twice during each molding operation.

A still further object of the invention is to provide a method and an apparatus for molding tubular bodies in a molding device having an outer mold and a core reciprocative axially thereof and serving therewith to provide a tubular mold space serving as a receptacle for receiving a concrete mass to form said tubular body and by which the body formed after the molding at first together with the said core is pushed out of the said outer mold and then retained outside said outer mold during extracting of the said core from the tubular body and in such a manner that said core during its extraction stroke is moved back to its initial position so that thereupon the molding device is ready for a new molding operation.

In the accompanying drawings illustrating the invention, in the several figures of which like parts are similarly designated, FIG. 1 is an axial, sectional elevation showing an embodiment of an apparatus in accordance with the invention, with the core in its lower position, FIG. 2 is a similar elevation showing the same apparatus, but with the core in its upper position, FIG. 3 is a plan view of a part of the apparatus, FIG. 4 is an axial, sectional elevation showing a slightly amended part of the apparatus, FIG. 5 is an axial, sectional elevation corresponding to FIG. 1, but showing a modified embodiment of an apparatus in accordance with the invention, and FIG. 6 is a partial sectional elevation taken on a line corresponding to line VI—VI of FIG. 3 showing a slightly modified embodiment of the part of the apparatus shown in FIG. 3.

In FIGS. 1 and 2, 1 indicates a substantially cylindrical outer mold which by means of a flange or feet 2, possibly with rubber plates between, is rigidly placed on a supporting plate 3 and stayed on this plate by means of oblique struts 4 of which only one is shown. Centrally positioned in the outer mold 1 a hollow core 5 is disposed axially reciprocatable. The upper end of this hollow core 5 is closed by a bottom 6.

The core 5 rests with its lower end on a disc-like displacement member 7. This is provided on its upper face with a circular projection 7a, the outer diameter of which corresponds to the inner diameter of core 5. Thus this projection 7a can guide the lower end of core 5 and thereby centre the cone with respect to the displacement member and thereby with respect to the outer mold 1. The core 5 may further be secured to said displacement member by means not shown, e.g. by means of threads on the projection 7a engaging corresponding threads of the lower end of the inner side of the hollow core 5. On its lower face the displacement member 7 is provided with a boss 8 by means of which it is secured to the free upper end of a piston rod 9 of a piston 10. This piston 10 is reciprocatable within a hydraulic cylinder 11 closed at both ends, and erected on a floor or a base A on which also columns 12 carrying the plate 3 are erected. The plate 3 is preferably, as indicated, secured betwen rubber blocks in brackets 13 on each of the columns 12 so that vibrations of the mold are not imparted to the floor or the base.

The outer mold 1 is at the top provided with an extension 1a so as to be able to form a sleeve on a tube molded in the mold space formed between the outer mold and the core 5. At the top the mold space is closed by a collar ring 14, FIG. 1, so as to be able to form a sleeve recess in the tube to be molded. The ring 14 is hinged to a bracket 14a at the upper end of the outer mold so that it may easily be swung to and fro in order to close and open the mold space respectively. The latter is closed at the bottom by a loosely arranged smooth surfaced supporting ring 15 disposed between the core 5 and the outer mold 1, said ring 15 being supported from below by a supporting member 16 on the lower part of the core. In the embodiment shown in FIGS. 1 and 2, the supporting ring 15 is formed as an angle ring, and the supporting member 16 is shaped as a flange on the core reaching under the vertical flange of said angle ring.

As shown in FIG. 4, the supporting member 16 may also be substituted by the part of the displacement member 7 situated outside the outer periphery of core 5. Further, provided that the outer diameter of the displacement member 7 corresponds to the inner diameter of the outer mold 1, as shown in FIG. 4, the supporting ring 15 may be omitted and substituted by the upper face of the part of the displacement member surrounding the core 5. The essential is that the supporting ring 15 or its substitute is movable in upwardly direction together with the core 5 while in downwardly direction it is expedient, but not necessary, that the supporting ring or its substitute is not bounded to move with the core.

The hydraulic cylinder 11 is at either end connected to a distribution tube 17 into which a four-way cock 18 is inserted, which cock furthermore is connected to an inlet pipe 19 and an outlet pipe 20 for a hydraulic pressure medium so that it is possible by changing the position of cock 18 to lead the pressure medium alternately to and from each of the ends of the cylinder and thus bring about a displacement of the piston 10 up and down and thereby corresponding displacements of the displacement member 7. Thus, by means of the displacement member 7, the core 5, the supporting member 16, and the supporting ring 15 may be displaced in the outer mold 1.

Supposing that the piston 10, the displacement member 7, and the core 5 are in the lower position illustrated in FIG. 1, whereas the collar ring 14 is turned to one side, see FIG. 2, so that the mold space between the mold 1 and the core 5 is open at the top, the molding of the tube takes place as follows:

A concrete mass adequate to form a tube is fed into the mold space and compressed herein, e.g. by vibration generated by means of a vibrator 21 arranged in the core or, as shown, on the outer mold 1. When the mold space is almost filled the collar ring 14 is positioned round the core and retained in the desired position by means of a suitable locking device 26 on the outer mold 1. By means of this collar ring 14 a sleeve recess is formed at the top of the molded tube. At the same time pressure medium is admitted to the lower end of the cylinder 10 so that the core and the supporting ring are pressed a little upward, and the concrete mass in the mold space thereby further compressed. The compression is interrupted, the collar ring 14 released and swung back whereafter the pressure medium is anew admitted to the lower end of the cylinder by changing the position or setting of the cock 18.

The core, the supporting ring, and the finished tube are now displaced upwardly out of the outer mold 1 until the tube indicated by 22 assume a position above the outer mold as illustrated in FIG. 2. In order to retain the molded tube 22 in the said position a guide and protecting member B is used, see FIGS. 2 and 3. This guide member comprises a longitudinally two or multi-way bushing 23 with a flange 24, confer especially FIG. 3, which when assembling the guide member round at least the lower part of the tube 22 rests on the upper edge of the outer mold 1. The guide member 23 is provided with projections 24a engaging the under side of the supporting ring 15. When the guide member, which is preferably provided with a handle 25, has been arranged round the tube 22 and the supporting ring 15 a pressure medium is admitted to the upper end of the cylinder 11 whereby the core 5 is displaced downwardly and drawn out of tube 22 until it is again in the initial position shown in FIG. 1. The tube may now be removed from the apparatus by means of the guide member and stored away for hardening resting on the supporting ring 15, the guide being removed from the tube. Now a new supporting ring is placed in the mold space between the core 5 and the outer mold 1, so that the ring will rest upon the collar 16 of the core, and the molding of a new tube may be commenced and carried out in the manner described above.

Especially in case no separate supporting ring is used, but even in connection with the use of such a ring the projections 24a may be wedge or knifeblade shaped at least at their inner edge and by the assembly of the member 23 round the tube project in between the lower end of the same and the supporting ring 15 or its substitute in which manner tube 22 is retained independent of said supporting ring when the core is drawn downwardly out of the tube. When the molded tube 22 has been removed from the apparatus together with the guide member the tube may be removed from the same and stored for hardening in the usual manner.

The outer mold and the core may be constructed for the molding of tubes or other tubular bodies of any desired shape, e.g. the cross section of which is polygonal or oval or tubes or the like having different cross sections lengthwise, e.g. conical tubes.

As shown in FIG. 5 the apparatus may also be constructed in such a manner that the displacement member 7 is secured at the upper end of the core 5 so that it forms the bottom at the upper end of the core thus making it possible to arrange the cylinder 10 extending up into the core. The distribution pipe 17 is in this case replaced by a channel 17a formed in the cylinder wall. Otherwise the apparatus and the operation of same are as described above.

Various changes and modifications are considered to be within the principle of the invention and the scope of the following claims.

What I claim is:

1. In a method for molding elongated thin-walled pipes from concrete in a molding device comprising an outer mold member having an upper end, a core member disposed within said outer mold member and defining therewith a mold space for receiving said concrete mass, and an annular supporting member disposed between said outer mold member and said core member and serving as a bottom of said mold space, one of said members being movable relative to the other, the steps comprising, feeding concrete mass into said mold space and compressing said mass within said mold space to form a pipe, vertically moving said pipe together with said core member and said supporting member relative to said outer mold member until said pipe has cleared said upper end of said outer mold member, thereafter supporting said pipe above said outer mold member and removing said core member from said pipe through the lower end thereof prior to hardening of said pipe.

2. In a method as claimed in claim 1, the further step of placing a protecting member around at least the lower part of said pipe closely surrounding the same after said pipe having cleared said outer mold member, but before said removal of said core member from said pipe, and removing said protecting member together with said pipe from said molding device prior to hardening of said pipe.

3. In an apparatus for molding elongated thin-walled concrete pipes, the combination of a stationary outer mold, a core axially reciprocatable in said outer mold and defining therewith a mold space serving as a receptacle for receiving a concrete mass adequate to form said pipe, a movable supporting ring disposed between said outer mold and said core and constituting a bottom of said mold space, means connected to said core operable for supporting said ring relative to said core, means actuatable for displacing said core upwardly until said supporting ring has been moved out of said outer mold and for subsequently displacing said core downwardly to its initial position, and retaining means removably positioned on said outer mold when said pipe has been lifted out of the outer mold, said retaining means engaging in said position said supporting ring and thereby being operable for retaining said ring and pipe above said outer mold during the said downward displacement of said core.

4. Apparatus for moulding elongated thin-walled concrete pipe bodies comprising a stationary outer mold, a displacement member reciprocative axially of said outer mold, a core axially displaceable within said outer mold defining therewith a mold space serving as a receptacle for receiving a concrete mass adequate to form said pipe body, said core being supported by and connected to said displacement member to be reciprocated together therewith, a supporting ring movably disposed between said outer mold and said core, and constituting a bottom of said mold space, means for supporting said ring relative to said core, means for displacing said displacement member and therewith said core upwardly at least until said supporting ring is moved out of said outer mold, and for subsequently displacing said displacement member and therewith said core downwardly again back to its initial position relative to said outer mold, and retaining means removably positioned on said outer mold when said body has been lifted out of the outer mold, said retaining means in that position engaging said supporting ring and thereby being operable for retaining the said ring and body above said outer mold during the said downwardly displacement of said core.

5. Apparatus as claimed in claim 4, in which said displacement member has a part extending outside the periphery of said core forming said means supporting from below said ring.

6. Apparatus for molding elongated thin-walled concrete pipe bodies comprising; a stationary outer mold, a displacement member axially reciprocatable within said outer mold, a core axially reciprocatable within said outer mold and serving therewith to provide a mold space serving as a receptacle for receiving a concrete mass adequate to form the said pipe body, said core being supported by and connected to said displacement member to be reciprocated together therewith, said displacement member having a part extending outside of said core, the periphery of said part fitting into said outer mold, said part having an upper face constituting a bottom of said mold space, and operable to support said body, means for displacing said displacement member and therewith said core upwardly at least until said upper face of said part is moved out of said outer mold thereby lifting said core and body out of the outer mold and for thereupon displacing said displacement member and therewith said core downwardly back to its initial position within said outer mold, and retaining means removably positioned on said outer mold when said body has been lifted out of the outer mold, said retaining means in that position being operable to support said body free from said part and thereby being actuatable for retaining the said body formed within said mold space above said outer mold during the said downwardly displacement of said core.

7. Apparatus for molding elongated thin-walled concrete pipe bodies, comprising; an outer mold, a core axially reciprocatable relative to said outer mold within the same and serving therewith to provide a mold space serving as a receptacle for receiving a concrete mass adequate to form the said pipe body, a supporting ring disposed between said outer mold and said core and constituting a bottom of said mold space, means for limiting a downwardly movement of said supporting ring relative to said core, means for displacing said core upwardly relative to said outer mold at least until said supporting ring is moved relative to said outer mold out of the same and for displacing said core downwardly relative to said outer mold back to its initial position relative to said outer mold, a housing formed of at least two parts and adapted in assembled state closely to surround at least the lower part of said body formed within said mold space when this body rests upon said supporting ring and together therewith has been displaced upwardly relative to said outer mold out of the same, said housing being provided at its lower end with outwardly extending projections of knife-blade shape adapted to rest upon the upper edge of said outer mold, said housing further being provided at its lower end with inwardly extending projections adapted during the assembling of said housing round said body to be pushed under said supporting ring and adapted to retain said supporting ring and thereby said body formed in said mold space above said outer mold during the said downwardly displacement of said core relative to said outer mold.

References Cited in the file of this patent
UNITED STATES PATENTS

| | | |
|---|---|---|
| 764,623 | Palmer | July 12, 1904 |
| 806,633 | Burnham | Dec. 5, 1905 |
| 965,007 | Pauly | July 19, 1910 |
| 968,360 | Johnson | Aug. 23, 1910 |
| 1,023,656 | Kern | Apr. 16, 1912 |
| 1,488,644 | Lewis et al. | Apr. 1, 1924 |
| 1,699,017 | Poore | Jan. 15, 1929 |
| 1,846,866 | Hauk | Feb. 23, 1932 |
| 2,193,879 | Muenzer | Mar. 19, 1940 |
| 2,198,284 | Kissam | Apr. 23, 1940 |
| 2,512,092 | Dike et al. | June 20, 1950 |
| 2,526,174 | Ukropina | Oct. 17, 1950 |
| 2,614,312 | Rankin et al. | Oct. 21, 1952 |
| 2,717,435 | Livingston | Sept. 13, 1955 |

FOREIGN PATENTS

| | | |
|---|---|---|
| 514,210 | Belgium | Sept. 30, 1952 |